United States Patent [19]
Sullwold

[11] Patent Number: 6,006,697
[45] Date of Patent: Dec. 28, 1999

[54] SYSTEM AND METHOD FOR DEHORNING CATTLE

[76] Inventor: Thomas Sullwold, 1228 100th Ave., Roberts, Wis. 54023

[21] Appl. No.: 09/334,429

[22] Filed: Jun. 16, 1999

[51] Int. Cl.⁶ .......................... A61B 17/36; A01K 29/00
[52] U.S. Cl. ............................ 119/174; 606/163
[58] Field of Search ................. 119/174; 606/163

[56] References Cited

U.S. PATENT DOCUMENTS

| | | | |
|---|---|---|---|
| 2,580,169 | 12/1951 | Golden et al. | 606/163 |
| 3,828,789 | 8/1974 | Young | 606/163 |
| 5,776,131 | 7/1998 | Hansen | 606/163 |

*Primary Examiner*—Thomas Price
*Attorney, Agent, or Firm*—Fredrikson & Byron, P.A.

[57] ABSTRACT

A method and system for dehorning cattle, the system including a unitary applicator that includes a backing, a receptacle for dehorning material, and an adhesive for use in applying and retaining the backing on the head of the calf with the dehorning material in contact with the horn bud.

20 Claims, No Drawings

SYSTEM AND METHOD FOR DEHORNING CATTLE

TECHNICAL FIELD

The present invention relates to methods, systems, and apparatuses for use in dehorning cattle. In another aspect, the invention relates to methods and materials such as bandages and wraps, for attachment or application to the body of mammals.

BACKGROUND OF THE INVENTION

It is a common practice in the cattle industry to dehorn beef calves at or before about 3 weeks prior to weaning and preferably before 8 weeks of age. Dehorning is considered an important safeguard that prevents the damage caused by horned cattle and the resultant carcass damage and losses. Dehorning at a young age minimizes the risks to the calf, the producer, and the purchaser. These risks include death in older calves, decreased live weight gains in the few weeks following dehorning of older calves, and the resultant loss in productivity.

Moreover, bruising caused by horned feedlot cattle has been reported to cost the world wide beef industry millions of dollars in losses from trimming damaged carcasses. Hornless cattle cause less injury and bruising to herd mates, and a saving on bunk space is possible with dehorned cattle. Moreover, the risk of injury to the operator is increased when working with horned cattle in confined areas, while the risks of death, illness and setback all tend to increase for calves dehorned at an older age.

The cow/calf producer's decision to dehorn and the timing (age) will be influenced by a variety of factors, including his facility, available labor force, expertise with the techniques, awareness of the impact of the procedure on calf health and productivity, and market for the calves. Normal management procedures provide a variety of convenient time and options for dehorning. At one day of age, for instance, the operator will typically apply an identification eartag and inject the calf with vitamin E-selenium, thereby requiring that the calf be restrained, and providing an opportunity to dehorn at the same time. Some producers prefer to batch the calves up weekly during calving season and dehorn many at one time.

Dehorning at an early age (less than about 8 weeks) reduces the risk of serious infection because the horn bud is removed without having to open the sinus (cavity) into the skull, as would occur when dehorning older calves. It is also preferable to avoid the summer and autumn periods when dehorning calves, since the risk of infection and fly strike is too great.

A variety of methods exist for removing horns, each with its own attributes and disadvantages. These include:

1. Polled Bull

The best method of dehorning is the use of a naturally polled bull in the breeding 109 program. The use of a naturally polled bull from naturally polled ancestors over hored breeding cows should result in the birth of polled calves. Continuous use of polled bulls over these female offspring should ensure that all calves continue to be polled. This method has obvious advantages where polled breeds are available with production characteristics similar to those in horned cattle.

2. Chemicals

Newborn calves (less than about 5–6 weeks of age) may be successfully dehorned by using caustic potash or caustic soda, which can be purchased in solid stick or paste form. The chemical destroys the horn-producing cells around the horn bud. In a common procedure the horn bud is exposed by pushing the hair back, and the caustic material is applied to the horn button. The hair is allowed to cover over the horn bud. Some operators prefer to clip the hair prior to applying caustic, which is said to help keep the caustic in place, reduce the risk of irritation to the cows udder and flanks, and reduce irritation to other facial skin of the calf.

This approach, though commonly used, involves several drawbacks however, including the need to avoid contact of the caustic material with the eyes of the calf or body of the user. It is also necessary to use gloves when applying the material, and to avoid application in rainy weather. Caustic pastes are inexpensive however, easy to use, and work well with minimal risk of scurs (residual horn growth). Care should be taken to ensure that the paste is applied only to the horn button and that the calf does not rub the horn against it's body. Otherwise, the paste can be rubbed off by the animal and/or it may run down the body, causing hair loss and irritation. As quantities of paste are lost in this manner, the effectiveness of the procedure can be greatly diminished, occasionally resulting in the formation of a deformed horn, which can be particularly difficult to remove.

3. Hot Iron Method

Application of a specially designed hot iron to the horn bud of the young calf will destroy the horn-producing tissue at the base of the horn. The system is bloodless and can be used at any time of the year on young calves up to 12 weeks of age. Depending on the age of the calf, anesthesia will be recommended. This method requires that the calf be adequately restrained, however, and excessive heat and application times will cause brain damage.

4. Dehorning Spoon or Tube

A number of devices provide a quick and efficient technique for removing horn buds in calves less than 8 weeks of age. They involve the use of a tube (4 sizes available) adapted to fit over the horn bud, and cover about ⅛ inch of skin around the horn base. The cutting edge of the tube is placed straight down over the horn, and the tube is pushed and twisted until the skin has been cut through. The cutting edge of the tube can be used to cut under the horn button area and remove it, after which some bleeding may occur and an antiseptic should be applied.

5. Barnes-Type Dehorners

This is a fast, simple dehorner to use on calves with horns 0.5 to 4 inches long. The handles of the apparatus are closed in a manner sufficient to fit knives over the horn. The instrument is positioned to remove a ring of skin with the horn, such that when the handles can be spread the handles apart quickly, closing the knives and removing the horn.

While dehorning has been an accepted part of cattle management for generations, greater awareness of animal welfare in recent years means that past methods can no longer be accepted without question. It must be appreciated that whatever temporary discomfort might be caused by dehorning is generally outweighed by the long-term benefits of having the whole herd flee from damage caused by horns.

In view of the cost, timing, and efficacy, however, as well as animal welfare and operator health and safety concerns, the cattle industry is ever in need newer and more effective methods and apparatuses for effectively dehorning cattle.

SUMMARY OF THE INVENTION

The present invention provides a method and system for dehorning cattle in a manner that is cost efficient and technically effective. In a preferred embodiment, the method involves the steps of providing an applicator (e.g., a unitary applicator) comprising a backing, a receptacle for dehorning material, and an amount of adhesive sufficient to retain the backing in contact with the area surrounding the horn bud of a young calf in a manner sufficient to retain the receptacle, and in turn the dehorning material, in contact with the horn bud. Both the adhesive and the dehorning material can, independently, be included with the applicator when packaged, or can be provided as a separate amount or in bulk, to be applied to the applicator at the time of use.

In a preferred embodiment the backing is provided having a shape and dimensions sufficient to substantially span across and thereby cover the horn bud of a calf. The backing can be provided in any suitable form, including in the form of a natural or synthetic (e.g., polymeric) material, including both woven and non-woven materials. The adhesive can be disposed directly on the backing at the time of manufacture, or can be packaged separately in a manner adapted to be disposed on the backing at the time of use. Particularly when the adhesive is pre-applied directly to, and packaged with the backing, the applicator preferably further includes a strippable liner positioned in contact with said adhesive material. Where either the dehorning paste and/or adhesive are separately packaged (e.g., either in individual or multiple portions, or in bulk) the system preferably further includes instruments (e.g., disposable spatulas or spoons) for use in applying the materials to the backing.

Both the dehorning material and/or the adhesive can therefore, independently, be provided (e.g., packaged and sold) in a form separate from the backing, or they can be applied to and provided in combination with the backing. In the former case, for instance, either or both of the dehorning material and adhesive can also be packaged and sold in bulk, for use in multiple applications, in order to be repeatedly accessed and applied to numerous backings. The dehorning material and/or adhesive can be separately packaged, in either the same or separate packaging and with or without the backing, in essence providing a kit for on site use (optionally including other components as well, including application instruments and the like). In using such a kit, the operator can apply the dehorning material to the receptacle and/or can apply the adhesive to the backing at the time of use. In an alternative, and preferred, embodiment, both the dehorning material and the adhesive are pre-applied to the backing (with the dehorning material to the receptacle and the adhesive to the surrounding backing), such that the user can simply open a package containing the system, perhaps remove a protective strip from the adhesive, and apply the system to the calf.

A preferred method of this invention therefore provides the steps of providing a system as described herein, and employing the system to apply the dehorning material to the horn using the backing and adhesive.

DETAILED DESCRIPTION

The present invention provides a method and system for use in dehorning cattle. In a preferred embodiment, the system comprises an applicator adapted to be positioned and retained on the head of the calf, and to contain and retain an effective amount of dehorning material in contact with the horn bud. In a preferred embodiment, the applicator comprises a backing, a receptacle for dehorning material, and an amount of adhesive sufficient to retain the backing in contact with the calf's head in a manner sufficient to retain the dehorning material in contact with the horn bud.

The backing itself preferably provides an optimal combination of such properties as tensile, tear, and elongation control, which in turn provide the ability to stretch, flex and conform for greater comfort and more secure use, as well as moisture-resistance sufficient to permit the applicator to stay on the often damp and dirty skin of the calf's head. The applicator is also preferably hypoallergenic and bioinert, and is adapted to position the dehorning material on the desired portion of the horn bud site itself. The backing further optionally also provides an optimal combination of such properties as absorbency, porosity, and moisture permeability (e.g., "breathable"), e.g., to permit moisture or fluids to be removed from the site to the extent desired.

The applicator, in either an "ready-to-use" format, or as a kit of component parts, can be effectively packaged in one or more sterile, easy to open wrappers or containers. Optionally, an antibacterial agent can be incorporated into one or more components of the applicator, or used as a separate layer, portion or component, to provide a barrier to help prevent contaminates from entering the site while letting oxygen in and moisture vapor out.

Ideally, the backing is provided having a shape and dimensions sufficient to substantially encompass the horn bud of a calf, and the receptacle is provided in the form of a recessed well positioned generally centrally within the backing. For instance, the backing can be substantially circular, having a diameter of between about 1 inch (about 2 cm) and about 5 inches (about 12 cm), or substantially square or rectangular having similar overall dimensions and area, and more preferably is a circle of about 2 inches (about 5 cm) diameter. The receptacle is also provided to have dimensions suitable for its intended use, e.g., for use in a circular backing the receptacle can be in the form of a substantially circular well, e.g., having a diameter between about one-quarter inch (about one-half cm) and about one inch (about 2.5 cm), and more preferably about ⅝ inch (about 1.5 cm) diameter. The receptacle also preferably has a depth of between about ¹⁄₁₆ inch and one-quarter inch (about 1 mm and about one-half cm). Receptacles substantially smaller than this overall volume range (diameter× depth) will typically not contain a sufficient quantity of dehorning material, while receptacles that are substantially larger in volume capacity will typically contain more material than is necessary and/or will require correspondingly larger adhesive backing surfaces to be retained on the head.

The applicator can be provided in the form of a flexible or semi-rigid backing having two major surfaces, including respectively, a surface adapted to be the adhesive-bearing, skin-contacting surface ("adhesive side", for short), and an opposite surface ("non-adhesive side", for short). The applicator can itself be transparent or translucent, colored , marked (or adapted to be marked) with visible indicia, and so on.

A backing of this invention can be provided in any suitable form, and can be fabricated from any suitable material or combination of materials. Suitable materials for use in preparing such a backing provide an optimal combination of such properties as strength, flexibility, durability, and compatibility with the adhesive and dehorning material. Examples of suitable materials include woven and non-woven textile and polymeric sheeting materials. Suitable textile materials including cotton, nylon, polyester, polypropylene, rayon, glass and high strength fibers, as well as yarns, including mono- or multifilament (synthetic) yarns or staple (natural or chopped filament) yarns.

Synthetic materials commonly used for sheeting materials (i.e., shaped plastic having a large width and length in relation to its thickness, with a thickness greater than about 250 microns) can be used for the backing as well. Backings of this variety can be formed, for instance, from synthetic polymers that include polyolefins, poly(vinyl chloride), polyesters, cellulosic esters, polystyrene, poly (methylmethacrylate) and polycarbonate resins, including combinations, multilayers, and mixtures thereof. Crosslinked or thermoset resins, including reinforced composite materials, can also be formed into such structures. Properties of these materials can be modified by the use of fillers, reinforcements, impact modifiers, nucleants, plasticizers, colorants, and other additives.

Other suitable backing materials include synthetic rubbers, including polybutadiene rubbers, polyisoprene rubbers, sytrene-butadiene rubbers, nitrile rubbers, butyl rubbers, ethylene-propylene terpolymers, silicone rubbers, neoprenes, polysulfides, polyacrylate rubbers, epichlorohydrin rubbers, fluoroelastomers, chorosulfonated polyethylene rubbers, halogenated butyl rubbers, chlorinated polyethylene rubbers, polyurethanes, and thermoplastic rubbers. See, e.g., "Rubber Compounding", pp. 1031–1036, in Kirk-Othmer, Concise Encyclopedia of Chemical Technology, Wiley-Interscience, 1985, the disclosure of which is incorporated herein by reference.

In a preferred embodiment, the backing provides a receptacle or other suitable means for retaining a sufficient quantity of a dehorning material. The receptacle can be in any suitable form as well, including in the form of a recessed well, or absorbent pad, adapted to retain an amount of dehorning material sufficient for the intended purpose. Optionally, the dehorning material can be incorporated, e.g., impregnated, into the backing material itself. In one preferred embodiment, the system is packaged having the dehorning material present in the receptacle of a backing, retained in place by a protective, removable cover. The adhesive can be provided on the backing itself, or in the form of a second component, adapted to be applied to the backing upon removal of the protective strip.

Given the present description those skilled in the art will be able to select and adapt a variety of known adhesives for use in the present invention. Suitable adhesives provide an optimal combination of such properties as tenacity, internal and cohesive strength, adhesion to mammalian tissue (including hair), durability, ease of use, biocompatability, and cost. Examples of suitable adhesives include, but are not limited to, acrylic, polyester, silicone, epoxy, and cyanoacrylate-based adhesives. A preferred adhesive for use in the method and system of this invention is particularly well suited for adhering to the skull of calves, when applied to the underside of a backing in the manner described herein, and under the rigorous conditions involved, e.g., outdoor use, rubbing and bumping with structures and other calves, and the like. The adhesive can either be positioned in place upon the backing, as packaged, or can be separately provided and applied to the backing at the time of use.

Particularly preferred are backings and adhesives commonly used for veterinary applications, e.g., as bandages and dressings, such as conforming bandages (e.g., sold under the tradenames Knit Firm, Knit Fix, K-Band, Crepe Knit, Hospicrepe, Vet-Band, and Vet-WOW), cohesive Bandages (e.g., sold under the tradenames Co-Flex, Powerflex, Co-Form, Co-Lastic, Co-Ripwrap), adhesive bandages (e.g., sold under the tradenames Bandesive, E-Band, R-Band), strappings and tapes (e.g., sold under the tradenames A-Tape, W-Tape, Omnifilm) and wound dressings (e.g., sold under the tradenames C-Stat, Rondopad, Grassolind, LP Dressings Pads, Vet-Ice Wraps, and Sanipore Strip).

For instance, Bandesive is described as an adhesive bandage of white, ribbon-woven elastic cloth having soft non-fray edges, and provided with a full spread, porous ventilated adhesive. It is currently sold and used for securing and protecting dressings over wounds and to give support and compression in the treatment of fractures, swollen joints and tissue traumas. C-STAT™, in turn, is a calcium alginate veterinary wound dressing sold in sterile form as a primary wound dressing pad, in a variety of sizes and in multi-item peel open packs. It is said to provide optimal moist healing environment with improved quality and speed of wound healing. Attributes of such a product that find relevance to the present invention include the need for fewer dressing changes, thereby providing extended intervals between applications, as well as easy application and removal, and minimal description of healing tissue with pain-free atraumatic dressing changes. Further attributes include soft, non-woven, comfortable dressing pads presented sterile in individual peel open packs.

Attributes of products such as the RONDOPAD® dressings can be adapted for use as well, which are provided as non-adherent perforated film absorbent dressings or wound pads, consisting of an absorbent layer of soft fleecy cellulosic and synthetic fibers, backed with a strong non-woven material cover, all lightly bonded to a polyester film on both surfaces which is evenly perforated with holes in a diamond pattern. The perforated film surface is non-adherent to wounds, while the highly absorbent pad draws off exudates.

Similarly, features of the SANIPORE-STRIP™ adhesive island wound dressing can be adapted for use in the present invention as well, in that they are provided in the form of highly conforming stretch backings that allow application to awkward sites. They provide an adhesive adapted for firm fixing surround with reduced possibility of damage or reaction on skin contact. They presently tend to be provided as large wound pads, approximately one third of dressing area, highly absorbent of exudate with minimal risk of sticking or causing pain or trauma on removal. Optionally, the dressings are composed of circular pieces or rectangular strips of highly conforming, fine non-woven, open mesh backing material, coated with pressure sensitive, microporous, hypoallergenic adhesive. When used as wound dressing pads, islands placed centrally, are soft and highly absorbent with specially treated anti-adherent contact surfaces. The whole dressing surface is protected under two overlapping peel back siliconated paper release strips.

The method and system of the present invention can incorporate existing dehorning materials, including for instance, those available commercially under the name "Dr. Naylor Dehorning Paste". The active ingredients in this and similar pastes is a combination of sodium hydroxide and calcium hydroxide. Dehorning can be defined as 'the removal of the horn of an animal by methods which destroy or remove the keratin-producing cells and structures at the base of the horn'.

In using a system of this invention, calves should be dehorned as early as possible. A tight calving pattern allows all calves to be dehorned at a similar age, effectively and humanely. If the calving pattern is spread out, groups of calves of similar ages can be selected for dehorning. It is best to dehorn calves at less than three months of age, since they suffer less stress, are more easily handled, heal quickly, and do not result in any significant setbacks. Cattle should be dehorned on dry cool days to allow the wound to dry quickly with the minimum risk of infection. The best time is late afternoon, when fly activity is usually low. Never dehorn cattle in wet weather, because the healing rate is decreased and the risk of infection increased.

A well designed calf cradle will restrain the calf and ensure that dehorning can be done effectively while minimizing stress and effort for both the operator and the calf. When a calf is restrained in a cradle, all marking and vaccination procedures can be done easily. Dehorning should be done last at marking time after calves are vaccinated and castrated.

For dehorning to be done successfully, operators need a basic knowledge of the internal structure of the horn and how it develops. The horn grows from the skin around its base in much the same way as the wall of the hoof grows down from the skin of the coronet of the foot. In young calves up to about two months of age, the horn bud is free-floating in the skin layer above the skull. As the calf grows older, the horn bud attaches to the skull and a small horn starts to grow. Dehorning should be performed before this attachment to the skull occurs. It then becomes a much simpler exercise, and results in far less bleeding.

Dehorning is most easily performed when the horn button takes shape. The button will feel like a hard lump under the skin of the calf's head and will move with the skin. As the heifer grows older and the horn begins to develop further, a bony anchor bonds the horn to the skull. After this, the horn becomes an immovable object on the head. It develops sinuses and a blood system and becomes more difficult and messy to remove. This may occur by the time the calf is two-months-old. At the earlier age of two weeks, there is very little horn growing tissue present. What is there is concentrated in a narrow area of skin at the base of the horn button and is easily destroyed. This is the time to dehorn to attain the smoothest, neatest head surface.

In using the system of this invention, it is best to restrain the animal with a halter of similar method of holding the animal's head. A clippers or scissors can then be used to remove enough hair in the area of the horn button, and preferably of at least the size of the applicator to be used. If the calf is several weeks old, it may be helpful to rough the button area. A system of the present invention is provided, e.g., having a backing containing a quantity of dehorning material with a central receptacle, and a protective cover on the adhesive side in order to retain the dehorning material. The system also contains a separate quantity of adhesive that can be applied to the backing upon removal of the protective cover. The resultant patch is applied to the area of the horn bud, with the dehorning material located in direct contact with the horn bud, and the adhesive sufficient to retain the applicator in position. The applicator is left in position for a period of time sufficient to remove the horn bud and effectively dehorn the calf.

What is claimed is:

1. A system for applying a dehorning material to the horn bud of a young calf, the system comprising a) a quantity of dehorning material, b) an applicator comprising a backing having a receptacle adapted to contain dehorning material, and c) a quantity of adhesive applied, or adapted to be applied, to the backing in a manner sufficient to retain the applicator on the head of the calf with the dehorning material in contact with the horn bud.

2. A system according to claim 1 wherein the backing is provided having a shape and dimensions sufficient to substantially span across the horn bud of a calf, and the receptacle is provided in the form of a recessed well positioned generally centrally within the backing.

3. A system according to claim 2 wherein the backing is substantially circular, having a diameter of between about 1 inch and about 5 inches.

4. A system according to claim 3 wherein the receptacle is substantially circular, having a diameter of between about one-quarter inch and about one inch.

5. A system according to claim 1 wherein the applicator is fabricated from a natural or synthetic material selected from the group consisting of woven and non-woven textiles and polymer sheet materials.

6. A system according to claim 5 wherein the adhesive is packaged as a separate component within the system, for application to the backing at the time of use.

7. A system according to claim 6 wherein the dehorning material is selected from the group consisting of caustic pastes.

8. A system according to claim 1 wherein the dehorning material and adhesive are disposed directly upon the backing at the time of manufacture and packaging.

9. A system according to claim 8 wherein the applicator further comprises a strippable liner covering the adhesive.

10. A system according to claim 1 wherein either the dehorning material or adhesive, or both, are separately packaged with the backing in the form of a kit, to be applied to the backing at the time of use.

11. A method of dehorning a young calf, the method comprising the steps of providing a system according to claim 1, restraining the calf, and applying the applicator to the calf's head in a manner sufficient to retain the dehorning paste in contact with the horn bud.

12. A method according to claim 11 wherein the backing is provided having a shape and dimensions sufficient to substantially span across the horn bud of a calf, and the receptacle is provided in the form of a recessed well positioned generally centrally within the backing.

13. A method according to claim 12 wherein the backing is substantially circular, having a diameter of between about 1 inch and about 5 inches.

14. A method according to claim 13 wherein the receptacle is substantially circular, having a diameter of between about one-quarter inch and about one inch.

15. A method according to claim 11 wherein the applicator is fabricated from a natural or synthetic material selected from the group consisting of woven and non-woven textiles and polymer sheet materials.

16. A method according to claim 15 wherein the adhesive is packaged as a separate component within the system, for application to the backing at the time of use.

17. A method according to claim 16 wherein the dehorning material is selected from the group consisting of caustic pastes.

18. A method according to claim 11 wherein the dehorning material and adhesive are disposed directly upon the backing at the time of manufacture and packaging.

19. A method according to claim 18 wherein the applicator further comprises a strippable liner covering the adhesive.

20. A method according to claim 11 wherein either the dehorning material or adhesive, or both, are separately packaged with the backing in the form of a kit, and are independently applied to the backing at the time of use.

* * * * *